Oct. 19, 1926. 1,603,617
T. H. LYNN
SUPPORTING BRACKET FOR TIRE CARRIERS
Filed May 17, 1922     2 Sheets-Sheet 1
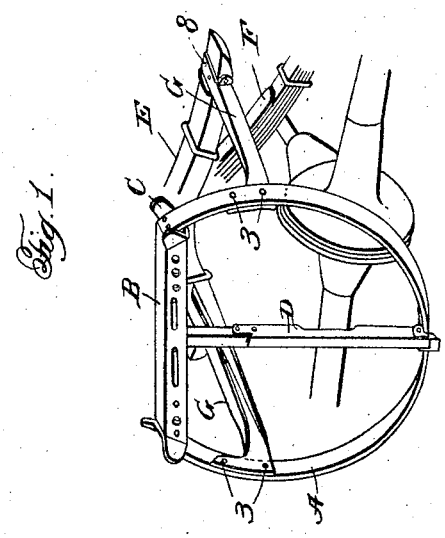
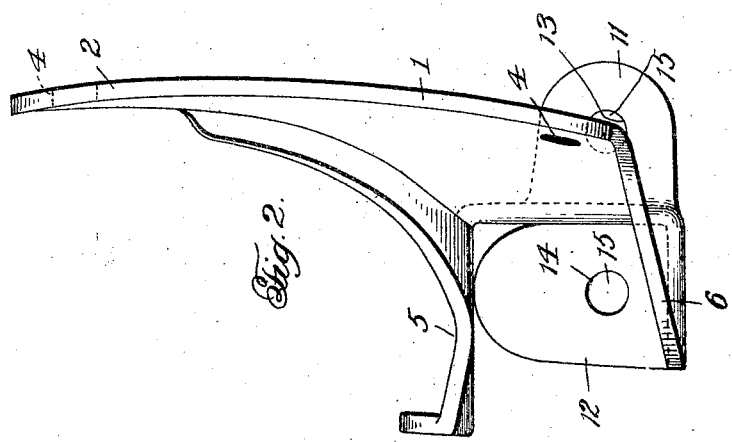
Witness:
Jas E. Hutchinson
Inventor:
Thomas H. Lynn,
By Milans & Milans
Attorneys Oct. 19, 1926.
T. H. LYNN
1,603,617
SUPPORTING BRACKET FOR TIRE CARRIERS
Filed May 17, 1922          2 Sheets-Sheet 2
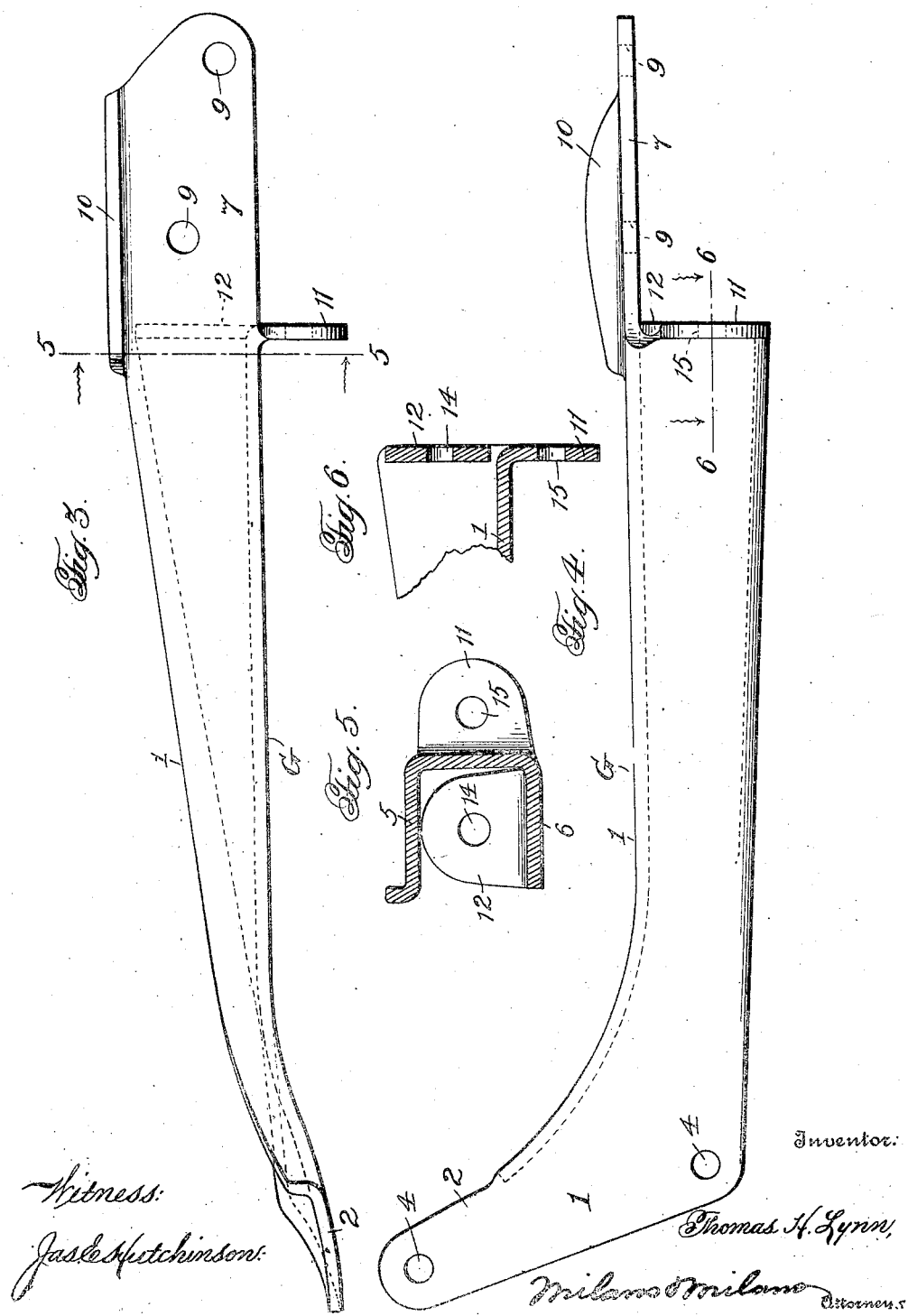
Inventor:
Thomas H. Lynn,
Witness:
Jas. E. Hutchinson Patented Oct. 19, 1926.

1,603,617

UNITED STATES PATENT OFFICE.

THOMAS H. LYNN, OF WILLIAMSPORT, PENNSYLVANIA.

SUPPORTING BRACKET FOR TIRE CARRIERS.

Application filed May 17, 1922. Serial No. 561,727.

This invention relates to improvements in supporting brackets or arms for tire carriers, and more particularly such a bracket or arm designed for attachment to a suitable part of an automobile frame in a manner to be projected rearwardly therefrom to suspend a tire carrier of suitable type at the rear of the vehicle according to the plan quite universally in vogue in this art.

When it is remembered that a tire carrier of the preferred types are ordinarily of metal construction and that they are intended to support detachable rims, also of metal, the latter in turn carrying a tire, usually of the inflated variety, it will be appreciated that the aggregate weight of these associated parts to be suspended and supported is quite great. Even in cases of tires of the smaller variety and appurtenant devices, the supporting brackets or arms for bearing this load must, in themselves, be of strong and rigid construction. However, of more serious consideration than this, is the attaching means for engaging the brackets with the frame of the vehicle. These have not been a problem of ready solution in the art, because of the vibrations and other forces exerted on the arms from the load borne thereby incident to the travel of the vehicle over roughened places and the like.

I have found that the most advanced stage of development in these supporting brackets or arms involves the formation of the same of angle metal to give the desired cross sectional strength, the provision of a foot-like portion having heel and toe attaching points for securement to the ring or equivalent part of the tire carrier, and projecting flanges adapted to overlie and engage the face of a beam of the vehicle frame. In such construction, however, the securing of the approximately right-angularly related flanges to the face and top of the beam has been accomplished by the use of bolts or the equivalents passing through the flanges and engaging the beam positioned generally in line longitudinally of the bracket or arm. In many instances this has proven unsatisfactory owing to the relative weakness of the overlying flange compared to the angular formation of the body and because there was but a single point of fastening to the face of the beam. lending itself to wabbling, rocking and subsequent shearing actions generated from the severe vertical and lateral swaying tendency and attending forces set up by the outer weighted ends of the brackets in the vertical and transverse or lateral thrusts of the vehicle. It is to overcome the objections hereinabove noted and thus substantially improve my earlier type of bracket to which I have just alluded, that the present invention has been conceived.

With the foregoing in mind, these improvements may be said to reside in the provision of a supporting arm having associated therewith two or more securing lugs or flanges adapted to afford a corresponding plurality of fastening points at the face of the connecting or supporting beams, or frame member of the vehicle; the formation of the body with the arm or bracket of U-formation to create top and bottom angles and flanges to give greater rigidity and strength thereto; the reinforcing, as by angular formation, of the top securing flange adapted to be attached to said supporting beam; the member of the vehicle frame; and the disposition of at least one of the securing lugs or flanges for the face of the beam in a manner to perform the additional function of a strut or brace bridging the box-like cross sectional interior of the body of the arm or bracket to reinforce the same against collapse, more especially at the approximate line of juncture between the top or beam overlying flange, and the remaining angular body portion of the arm or bracket.

The details in the construction and arrangement of parts constituting the preferred embodiment of my invention will be easily understood from the illustration thereof in the accompanying drawings when considered in connection with the specific description of said drawings hereinafter contained.

In the drawings:

Figure 1 is a perspective view illustrating the use of the improved supporting brackets or arms, the vehicle being shown in merely a fragmentary manner and the tire carrier in conventional form to eliminate unimportant detail;

Figure 2 is an end view looking at the device from the foot or carrier attaching end;

Figure 3 is a top view;

Figure 4 an elevation of the outer side of the device;

Figure 5 is a transverse sectional view on the line 5—5 of Fig. 3 looking to the right or in the direction of the arrows; and Figure 6 is a horizontal sectional view on the line 6—6 of Figure 4.

Referring more specifically to the drawings wherein like letters designate the same parts in the several views, A represents the base band or body of a tire carrier, the details of which need not be herein recited save to point out that in the carrier diagrammatically depicted, the band is of curved formation, connected at the top by a bar B spanning the interior space of the band and formed with receiving portions C to center and retain the tire-equipped detachable rim, any desired clamping or locking means indicated generally at D being utilized, all in the manner and form now well known to the trade.

E represents a beam or frame member associated with the body of an automobile, as in the standard Ford car, such beam serving for attachment or engagement with the central or intermediate portion of the usual spring F. This beam or its equivalent constitutes an efficient and convenient attaching means and support for the tire carrier and the supporting arms or brackets constituting the direct medium to that end may now be considered in detail. It is to be understood that these brackets or arms are preferably employed in pairs comprising what are known as right and left hand brackets, so that a description of one will suffice for both excepting in the single variation that they are reversely formed as seen in the drawings so that the hollow interiors of the brackets are located inwardly, or vice versa, and the foot portions curved in opposite directions outwardly to conform to the contour of the base band or ring A of the tire carrier to which said foot portions are to be attached.

The supporting arms or brackets are indicated generally at G and as previously stated, are of metal, cast or stamped into the desired shape. These arms or brackets, when in use, are arranged in pairs, and each comprises a horizontal body portion 1, the outer end of which is formed with the upwardly directed extension 2, to form a foot portion, the foot portions of the pair of arms being curved in opposite directions outwardly to conform to the contour of the base band or ring A of the tire carrier to which said foot portions are attached by means of bolts or rivets 3 which pass through the vertically spaced openings 4 in the foot portions. The body is of substantially U formation to create the top and bottom angles or flanges 5 and 6, respectively, to give greater strength and rigidity thereto. The inner end of the body has the extension 7 which is adapted to overlie the beam E and be secured thereto by means of bolts or rivets 8 which pass through openings 9 provided in the said extension. The extension 7 is a continuation of the upper angle or flange 5 and along its inner edge is provided with an upwardly extending flange 10 to give strength thereto, this flange 10 being of substantial length bridging the line of juncture between the extension 7 and remaining box-like body portion.

An outwardly extending ear or lug 11 is formed at the inner end of the body 1 and an upwardly extending ear or lug 12 is formed on the inner end of the bottom angle or flange 6, said ear or lug 12 forming a strut or brace bridging the box-like cross-sectional interior of the body of the arm or bracket to reinforce the same against collapse, more especially at the approximate line of juncture between the top or beam overlying flange or extension 7 and the remaining angular body portion of the arm or bracket. The ears or lugs 11 and 12 are provided with openings 13 and 14, respectively, to receive a bolt or rivet 15 which passes through the beam E, it being understood that when the arms or brackets are in position for securing to the beam the ears or lugs will engage the front face thereof.

From the above detailed description, it will be seen that I have provided arms or brackets of considerable strength for supporting tire carriers and that they are secured to the beam at a plurality of points by the flange which overlies the beam and the lugs or ears which engage the front face of the beam, the overlying flange being strengthened by the flange on one edge thereof. At the same time one of the securing ears or lugs bridges the box-like structure of the body to reinforce the same against collapse. With a construction as described, the arm or bracket is held against wobbling, rocking, and subsequent shearing actions which have been common in brackets previously used, due to the vertical and lateral swinging tendencies attending use of the device.

Having thus described my invention, what I claim is:—

1. A supporting arm or bracket having an extension adapted to overlie a beam or other support to which it is adapted to be secured, and ears adapted to engage the face of the beam or object at separated points.

2. A supporting arm or bracket having an extension adapted to overlie a beam or other support to which it is adapted to be secured, and ears adapted to engage the face of the beam or object at separated points, said extension having a reinforcing flange along one edge.

3. A supporting arm for tire carriers having an angular body portion carrying an extension for fastening to a part of the vehicle, and means angularly disposed with reference to said extension adapted to be fastened in disaligned position relative to the fastening of said extension, the latter comprising spaced ears adapted to receive securing means.

4. A supporting arm for tire carriers having an angular body portion carrying an extension for fastening to a part of the vehicle, and means angularly disposed with reference to said extension adapted to be fastened in disaligned position relative to the fastening of said extension, the latter comprising spaced ears adapted to receive securing means, at least one of said ears being integral and offset from a part of the body portion, and the other ear being offset from a flange-like part secured to said body portion.

5. A supporting bracket for tire carriers comprising an angular body portion having an extension projecting from and substantially in line with one of the angular members, an offset ear or lug on another member of the angular body portion, and a spaced second lug or ear secured to the angular body to constitute correspondingly separated fastening members to cooperate with the first mentioned extension, there being a strengthening and reinforcing angle on the body and extension and bridging the line of juncture between the extension and remaining portion of the body.

6. A supporting bracket of the character described having a body of box-like formation including a side and top and bottom flanges, an extension adapted to overlie a support to which it is adapted to be secured, an ear extending outwardly from the side, and an ear extending upwardly from the bottom flange, each of said ears having an opening therein to receive means for securing the arm to the support.

In testimony whereof I hereunto affix my signature.

THOMAS H. LYNN.